United States Patent
Owens

(10) Patent No.: US 6,392,201 B1
(45) Date of Patent: May 21, 2002

(54) CATERING APPARATUS AND METHOD FOR DELIVERING HEATED FOOD PRODUCT

(75) Inventor: Byron C. Owens, Asheboro, NC (US)

(73) Assignee: Vesture Corporation, Asheboro, NC (US)

(*) Notice: Subject to any disclaimer, the term of this patent is extended or adjusted under 35 U.S.C. 154(b) by 0 days.

(21) Appl. No.: 09/639,585

(22) Filed: Aug. 16, 2000

(51) Int. Cl.[7] ................................. A47J 39/02
(52) U.S. Cl. ........................ 219/387; 99/483
(58) Field of Search ................. 219/386, 387, 219/406–410; 99/483; 312/236; 222/146.5

(56) References Cited

U.S. PATENT DOCUMENTS

| | | | |
|---|---|---|---|
| 1,439,094 A | | 12/1922 | Gingras |
| 2,479,268 A | | 8/1949 | Sarria |
| 3,017,493 A | | 1/1962 | Cooke |
| 3,129,317 A | * | 4/1964 | Howard ............ 219/387 |
| 3,202,801 A | | 8/1965 | Saluri |
| 3,205,033 A | * | 9/1965 | Stentz ............ 219/386 |
| 3,273,634 A | | 9/1966 | Snelling |
| 3,387,114 A | * | 6/1968 | Blake et al. ........ 219/386 |
| 3,395,267 A | * | 7/1968 | MacKay ............ 219/387 |
| 3,721,803 A | | 3/1973 | DiStefano |
| 3,780,262 A | | 12/1973 | Rudd |
| 4,147,921 A | | 4/1979 | Walter et al. |
| 4,198,559 A | | 4/1980 | Walter et al. |
| 4,345,143 A | * | 8/1982 | Craig et al. ........ 219/386 |
| 4,376,558 A | * | 3/1983 | Bandar ............ 312/259 |
| 4,528,439 A | | 7/1985 | Marney, Jr. et al. |
| 4,672,178 A | | 6/1987 | Wada et al. |
| 4,775,002 A | * | 10/1988 | Iwamoto ............ 312/236 |
| 4,777,346 A | | 10/1988 | Swanton, Jr. |
| 4,806,736 A | | 2/1989 | Schirico |
| 4,816,646 A | | 3/1989 | Solomon et al. |
| 4,817,704 A | | 4/1989 | Yamashita |
| 4,868,898 A | | 9/1989 | Seto |
| 4,904,846 A | | 2/1990 | Oscadal |
| 4,916,290 A | | 4/1990 | Hawkins |

(List continued on next page.)

FOREIGN PATENT DOCUMENTS

| | | |
|---|---|---|
| EP | 0 001 151 A3 | 3/1979 |
| GB | 2 160 965 A | 1/1986 |
| GB | 2 195 015 A | 3/1988 |
| GB | 2 272 969 A | 6/1994 |
| JP | 57-96078 | 6/1982 |
| JP | 57-96978 | 6/1982 |
| JP | 62-241287 | 10/1987 |

OTHER PUBLICATIONS

"Stop throwing your money away on Vinyl Poucle", *Thermal Bags by Ingrid, Inc*, 6 pages (Date Unknown).

Primary Examiner—Joseph Pelham
(74) Attorney, Agent, or Firm—Merchant & Gould P.C.

(57) ABSTRACT

A catering apparatus for delivering heated food product is provided according to the invention. The catering apparatus includes a catering delivery rack, a cover covering at least a portion of the catering delivery rack, and at least one thermal transfer unit provided extending along at least one side of the catering delivery rack. The catering delivery rack includes a frame having a front side, a rear side, a right side, a left side, a top end, and a bottom end. The frame includes a plurality of shelves provided between the top end and the bottom end of the catering delivery rack, and a plurality of wheels provided for movement of the catering delivery rack. The cover covers at least a portion of the front side, the backside, the left side, and the right side of the catering delivery rack. The thermal transfer unit includes an electrical resistance heating grid, a container for containing the electrical resistance heating grid, and a power cord for providing electrical connectivity between the electrical resistance heating grid and a power source. A method for delivering heated food product is provided according to the invention. The method includes a step of providing food within a catering apparatus, and generating heat within the catering apparatus.

7 Claims, 6 Drawing Sheets

U.S. PATENT DOCUMENTS

| | | |
|---|---|---|
| 4,929,094 A | 5/1990 | Becker |
| 4,933,534 A | 6/1990 | Cunningham et al. |
| 4,979,923 A | 12/1990 | Tanaka |
| 5,128,522 A | 7/1992 | Marx et al. |
| 5,150,707 A | 9/1992 | Anderson |
| 5,159,177 A | 10/1992 | Kinberger |
| 5,211,949 A | 5/1993 | Salyer |
| 5,293,583 A * | 3/1994 | Chudgar .................... 219/386 |
| 5,297,616 A * | 3/1994 | Pralus ....................... 219/387 |
| 5,329,096 A | 7/1994 | Suematsu |
| 5,404,935 A * | 4/1995 | Liebermann ............... 219/387 |
| 5,423,996 A | 6/1995 | Salyer |
| 5,454,471 A | 10/1995 | Norvell |
| 5,552,075 A | 9/1996 | Salyer |
| 5,650,090 A | 7/1997 | Salyer |
| 5,750,962 A * | 5/1998 | Hyatt ......................... 219/387 |
| 5,782,174 A * | 7/1998 | Cohn et al. ................. 219/386 |
| 5,800,435 A * | 3/1999 | Bostic ........................ 219/387 |
| 5,884,006 A | 3/1999 | Frohlich et al. |
| 5,892,202 A | 4/1999 | Baldwin et al. |
| 5,932,129 A | 8/1999 | Hyatt |
| 5,999,699 A | 12/1999 | Hyatt |
| 6,018,143 A | 1/2000 | Check |
| 6,105,818 A * | 8/2000 | Speranza .................... 219/386 |

* cited by examiner

CATERING APPARATUS AND METHOD FOR DELIVERING HEATED FOOD PRODUCT

FIELD OF THE INVENTION

The invention relates to a catering apparatus for delivery of heated food product and to a method for delivering heated food product.

BACKGROUND OF THE INVENTION

Caterers are often asked to prepare large quantities of food. As a result, it is often necessary to prepare the food at one location and then deliver it to another location. In the case of heated food, it is desirable for the heated food to remain hot when eaten. A particular type of food that is often catered to large gatherings includes pizza.

Exemplary pizza delivery containers are described by U.S. Pat. No. 5,750,962 to Hyatt; U.S. Pat. No. 5,932,129 to Hyatt; U.S. Pat. No. 5,892,202 to Baldwin et al.; and U.S. Pat. No. 5,880,435 to Bostic. The assignee of these four patents is Vesture Corporation, the assignee of the above-identified patent application.

SUMMARY OF THE INVENTION

A catering apparatus for delivering heated food product is provided according to the invention. The catering apparatus includes a catering delivery rack, a cover covering at least a portion of the catering delivery rack, and at least one thermal transfer unit provided extending along at least one side of the catering delivery rack. The catering delivery rack includes a frame having a front side, a rear side, a right side, a left side, a top end, and a bottom end. The catering delivery rack includes a plurality of shelves provided between the top end and the bottom end of the catering delivery rack, and a plurality of wheels provided for movement of the catering delivery rack. The cover covers at least a portion of the front side, the backside, the left side, and the right side of the catering delivery rack. The thermal transfer unit includes an electrical resistance heating grid, a container for containing the electrical resistance heating grid, and a power cord for providing electrical connectivity between the electrical resistance heating grid and a power source.

A method for delivering heated food product is provided according to the invention. The method includes a step of providing food within a catering apparatus, and generating heat within the catering apparatus. The food product preferably includes pizza.

DETAILED DESCRIPTION OF THE PREFERRED EMBODIMENTS

Figure 1:
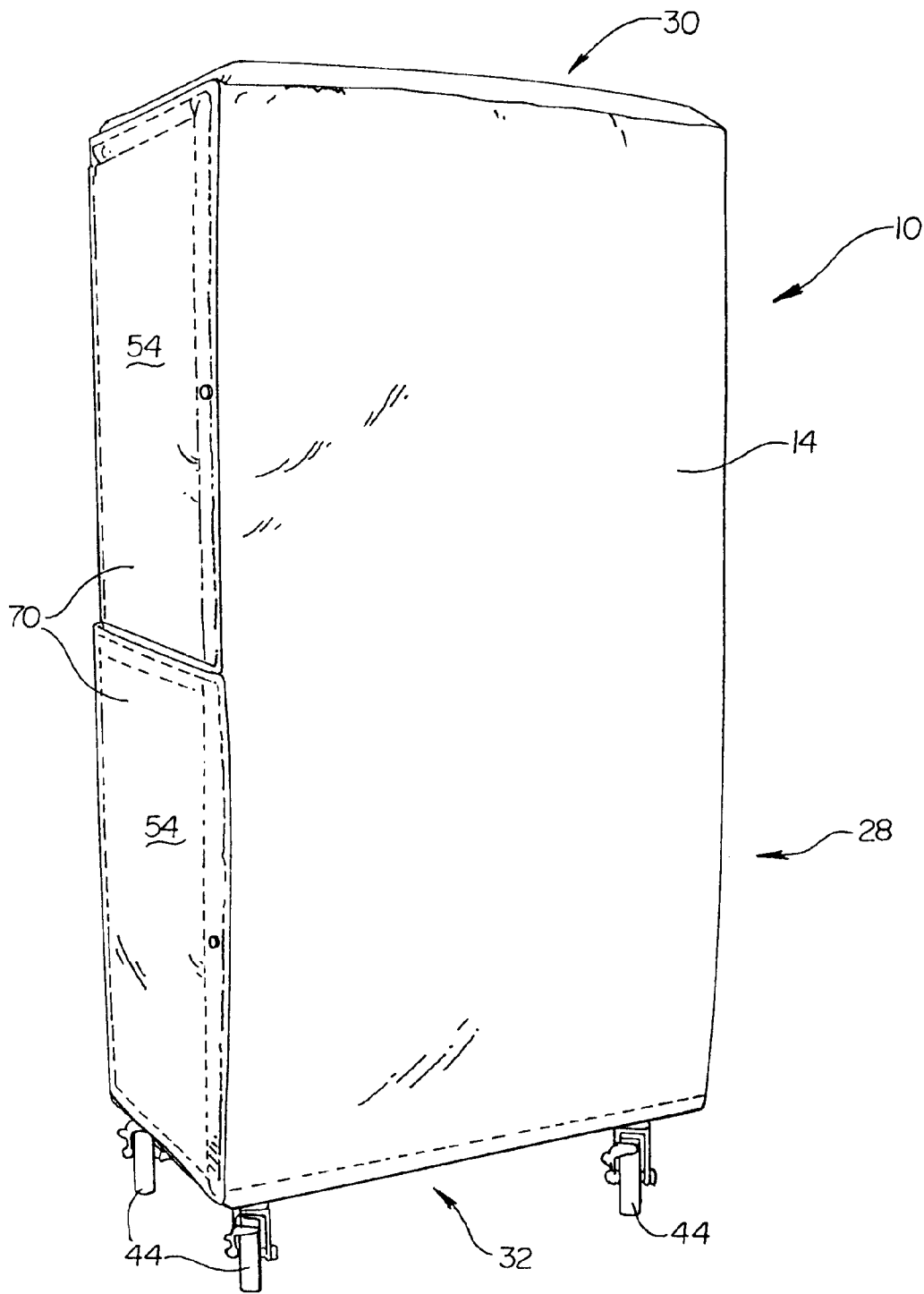
FIG. 1 is a perspective view of a catering apparatus for delivering heated food product according to the present invention.
Figure 2:
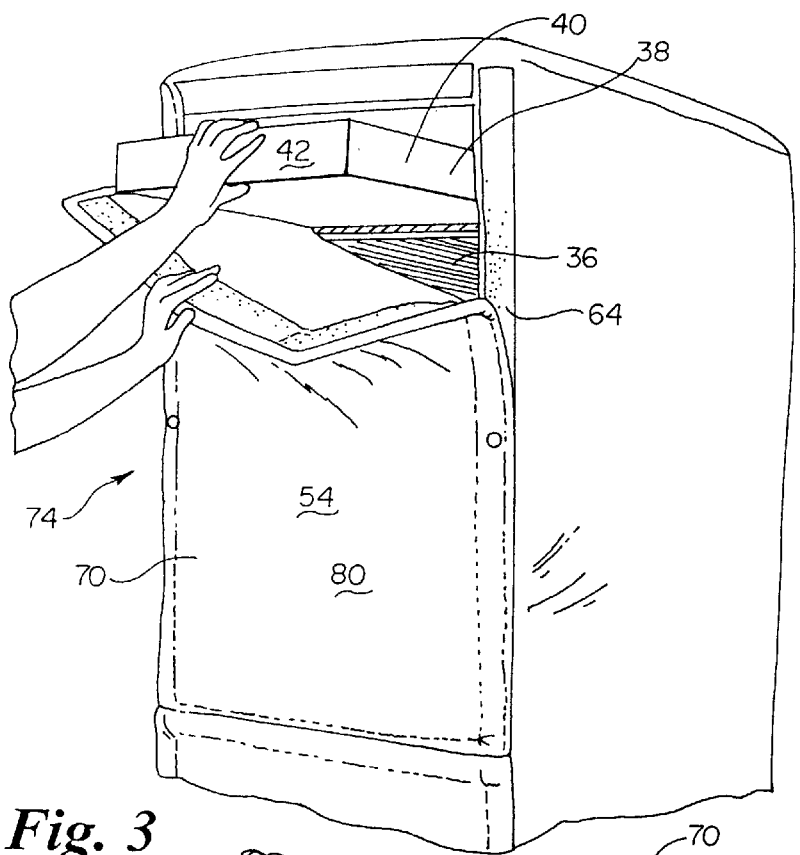
FIG. 2 is a partial perspective view of the top region of the catering apparatus shown in FIG. 1.
Figure 3:
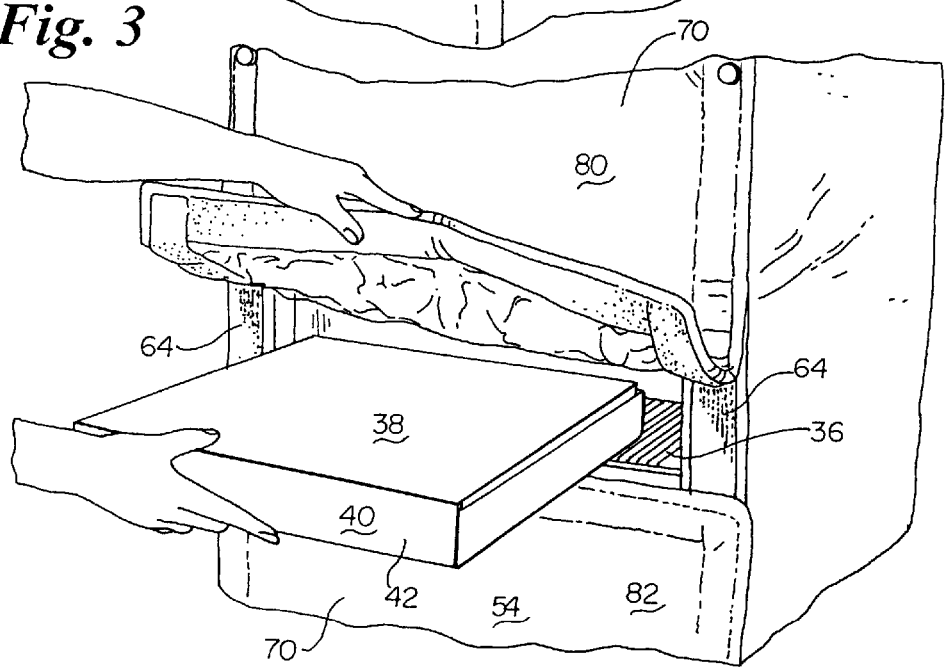
FIG. 3 is a partial perspective view of the top region of the catering apparatus of FIG. 1.
Figure 4:
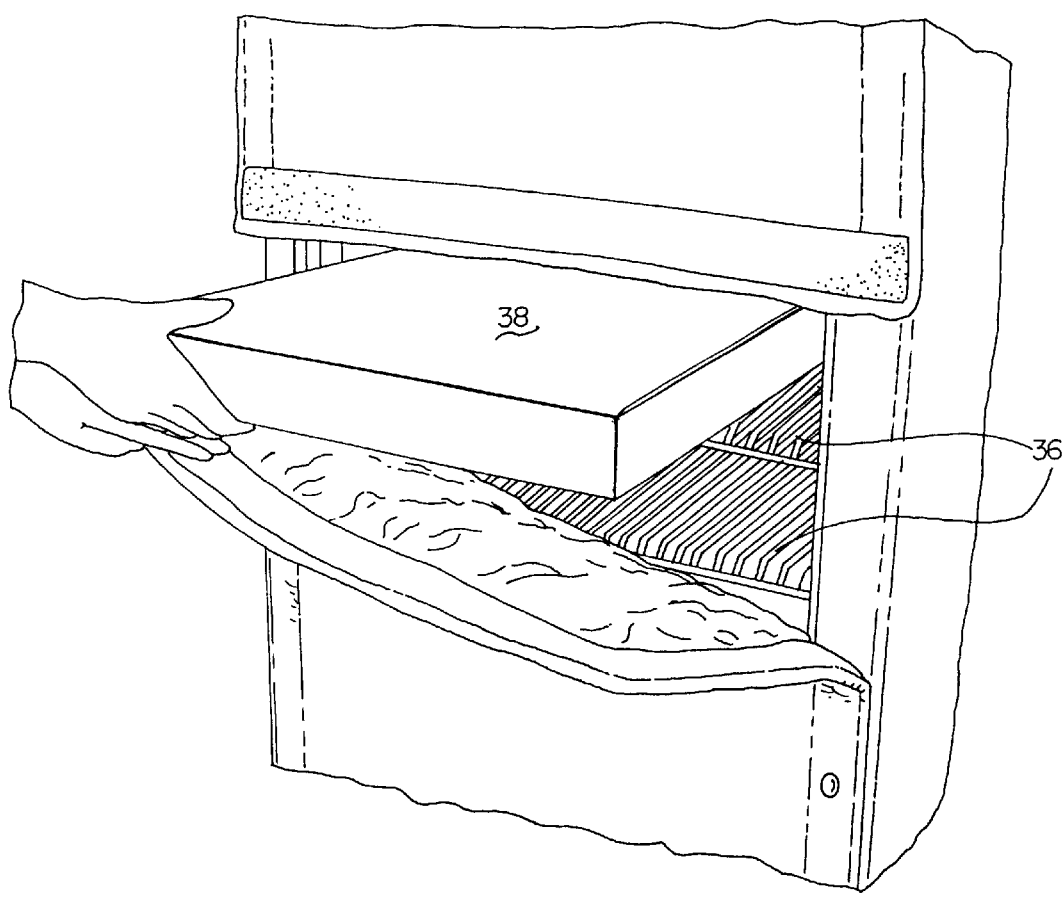
FIG. 4 is a partial perspective view of the bottom region of the catering apparatus of FIG. 1.
Figure 5:
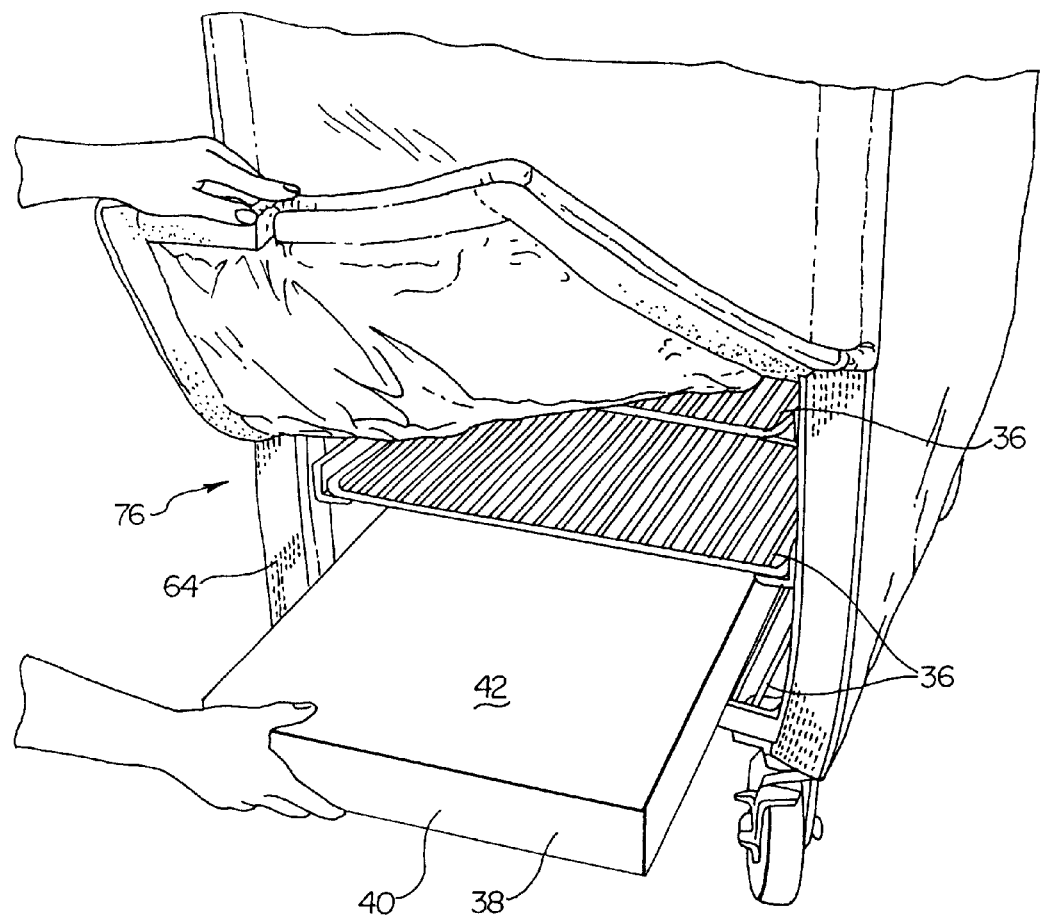
FIG. 5 is a partial perspective view of the bottom region of the catering apparatus of FIG. 1.

Now referring to FIGS. 1–6, a preferred embodiment of the catering apparatus for delivering heated food product according to the invention is shown at reference numeral 10. The catering apparatus for delivering heated food product 10 can be referred to as the catering apparatus. The catering apparatus 10 includes a catering delivery rack 12, an insulated cover 14, and a plurality of thermal transfer units 16.

The catering delivery rack 12 includes a frame 20 having a front side 22, a rear side 24, a left side 26, a right side 28, a top end 30, and a bottom end 32. The catering delivery rack 12 also has a front side 23, a rear side 25, a left side 27, a right side 28, a top end 31, and a bottom end 33. It should be understood that the reference to a "side" or an "end" is not a limitation on the configuration of the rack 12. That is, the rack can be provided with a configuration that is square, rectangular, circular, etc. and can be considered as having front, rear, left and right sides, a top end, and a bottom end. The frame 20 includes a plurality of shelf supports 34 arranged between the top end 30 and the bottom end 32. The shelf supports 34 are provided to support the plurality of shelves 36. The shelves 36 are provided for supporting a food product 38 within the catering delivery rack 12. A preferred type of food product 38 which can be transported according to the invention is pizza 40. Preferably, the pizza 40 is provided as a cardboard box 42 containing a pizza therein.

The catering delivery rack 12 includes a plurality of wheels 44 for allowing movement of the catering delivery rack 12 across a floor. Preferably, the catering delivery rack 12 includes four wheels 44 which are attached to the frame 20. Preferably, the wheels 44 are of a type that allows for movement of the catering apparatus 10 in various directions.

The insulated cover 14 is provided for decreasing the rate of heat transfer from within the catering apparatus 10 to outside the catering apparatus 10. Accordingly, the insulated cover 14 includes a sufficient amount of insulation to reduce the flow of heat out of the catering apparatus. In addition, the insulated cover preferably includes a left cover 50, a right cover 52, a front cover 54, and a rear cover 56 which generally covers the front side 22, left side 26, right side 28, and rear side 24 of the frame 20. Preferably, the insulated cover 14 includes a top cover 58 for covering the top end 30 of the catering delivery rack 12.

The insulated cover 12 is provided so that the front cover 54 is removable. Preferably, the left side cover 50, the right side cover 52, the rear side cover 56, and the top cover 58 are attached together to form an enclosure. Preferably, the frame includes a front surface 60 having a plurality of fasteners 62 provided along its length between the top and bottom. The left side cover 50 and the right side cover 52 preferably include a forward edge 64 having a plurality of fasteners 66 for fastening to the forward surface 60. Preferably, the fasteners 62 and 66 are snap-type fasteners, although any other fastening arrangement can be provided for holding an insulated cover 14 to the catering delivery rack 12.

The front cover 54 preferably includes a plurality of panels 70 for accessing different regions of the catering delivery rack 12. Preferably, the catering delivery rack 12 includes an upper region 74 and a lower region 76. The front cover preferably includes an upper region panel 80 and a lower region panel 82. The upper region panel 80 can be provided for accessing the upper region 74, and the lower region panel 82 can be provided for accessing the lower region 76.

Figure 6:
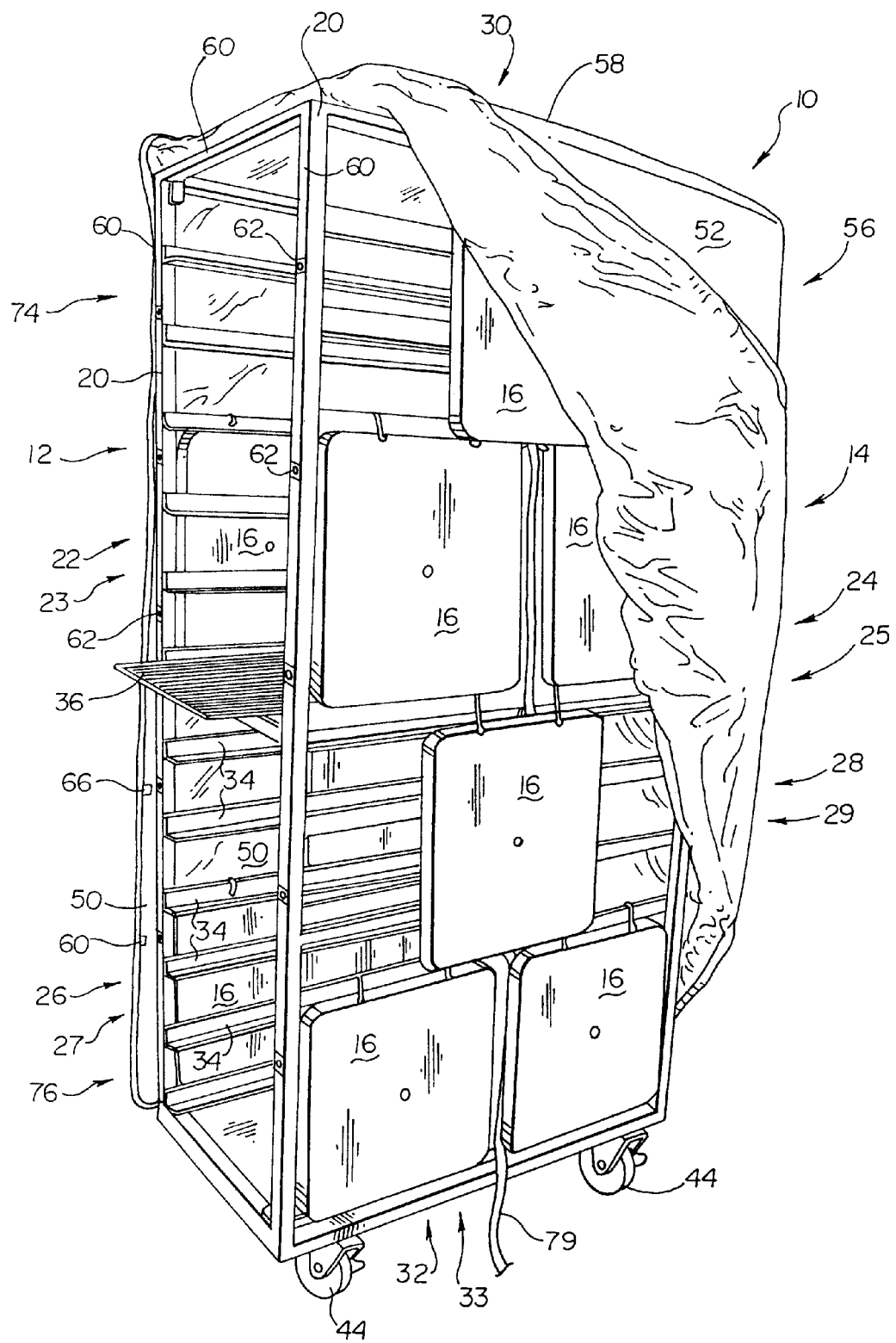
FIG. 6 is a perspective view of the catering apparatus of FIG. 1, with the insulated cover at least partially removed.

The thermal transfer units 16 are shown extending along the left side and the right side of the catering delivery rack 12. As shown in FIG. 6, the catering apparatus 10 includes six thermal transfer units 16 provided along the right side 28. In addition, six thermal transfer units 16 are provided extending along the left side 26. The catering apparatus 10 can include more or less thermal transfer units 16. Preferably, the thermal transfer units 16 are arranged so that they do not interfere with the storage area of the food product within the catering apparatus 10. The thermal transfer units 16 are preferably electrically charged by electrical current running through the power chord 79.

Figure 7:
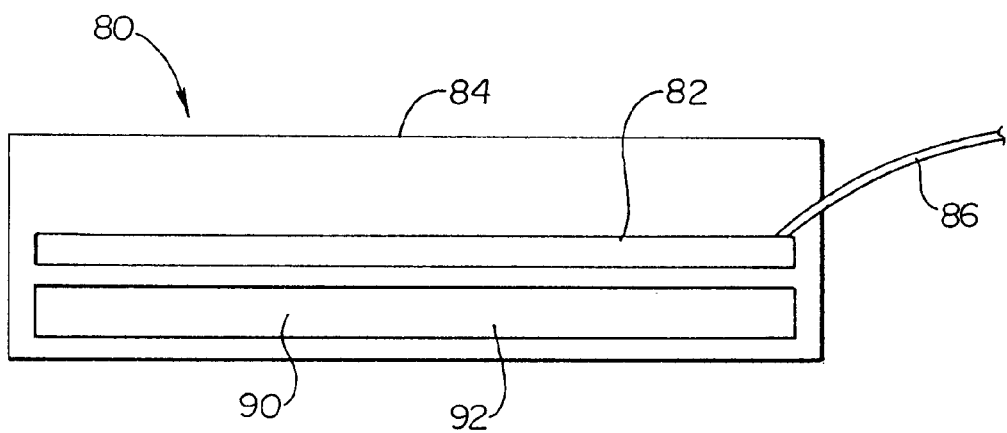
FIG. 7 is a sectional view with an exemplary thermal transfer unit.

Now referring to FIG. 7, a thermal transfer unit 80 is shown. The thermal transfer unit 80 includes an electrical resistance heating grid 82, a container 84 for containing the electrical resistance heating grid 82, and a power chord 86 for providing electrical conductivity between the electrical resistance heating grid 82 and a power source. The thermal transfer unit 80 can include a heat sink 90 which can be any material capable of storing heat and releasing heat. The heat sink 90 can be a phase change material 92. Thermal units which can be used according to the invention are described in U.S. Pat. Nos. 5,750,962; 5,932,129; 5,880,435; and 5,892,202. The entire disclosures of U.S. Pat. Nos. 5,750,962; 5,932,129; 5,880,435; and 5,892,202 are incorporated herein by reference in their entirety.

The above specification provides a complete description of the invention. Since many embodiments of the invention can be made without departing from the spirit and scope of the invention, the invention resides in the claims hereinafter appended.

I claim:

1. A catering apparatus for delivering heated food product; said catering apparatus comprising:
   (a) a catering delivery rack comprising:
      (i) a frame having a top end and a bottom end, and including an upper region and a lower region;
      (ii) wheels attached to the frame and oriented so that said catering apparatus can be rolled on the wheels;
      (iii) a first shelf support positioned in the upper region;
      (iv) a second shelf support positioned in the lower region;
      (v) a third shelf support positioned intermediate the first and second shelf supports;
      (vi) first, second, and third shelves respectively supported by said first, second, and third shelf supports; and
      (vii) said frame including an front access side for access to said first, second, and third shelves;
   (b) an insulated cover having a front cover secured over said front access side,
      (i) said front cover being constructed and arranged for selective opening:
         (A) to provide selective access to said upper region and said first shelf without opening said lower region and exposing said second shelf;
         (B) to provide selective access to said lower region and said second shelf without opening said upper region and exposing said first shelf; and
         (C) to provide selective access to said third shelf positioned intermediate said first and second shelf supports without exposing said first shelf or said second shelf; and
   (c) a plurality of thermal transfer units including at least a first thermal transfer unit and a second thermal transfer unit;
      (i) said first thermal transfer unit:
         (A) comprising a first electrical resistance heating grid enclosed within a first container; and
         (B) being positioned at said upper region of said frame;
      (ii) said second thermal transfer unit:
         (A) comprising a second electrical resistance heating grid enclosed within a second container; and
         (B) being positioned at said lower region of said frame; and
      (iii) each of said first and second thermal transfer units being electrically charged.

2. The catering apparatus according to claim 1, wherein:
   (a) said front cover includes a plurality of panels, including at least an upper panel and a lower panel.

3. The catering apparatus according to claim 1, wherein:
   (a) the insulated cover includes:
      (i) a right side cover;
      (ii) a left side cover;
      (iii) a back side cover; and
      (iv) a top cover; and
   (b) the right side cover, the left side cover, the back side cover, and the top cover being attached together to form an enclosure.

4. The catering apparatus according to claim 3, wherein:
   (a) the right side cover includes a first plurality of snap fasteners;
   (b) the left side cover includes a second plurality of snap fasteners; and
   (c) the frame includes a third plurality of snap fasteners positioned to correspond to the first and second plurality of snap fasteners of the right side cover and the left side cover, respectively, for removably securing the right side cover and the left side cover of the enclosure to the frame.

5. The catering apparatus according to claim 3, wherein:
   (a) the first thermal transfer unit is adjacent one of the side covers; and
   (b) the first thermal transfer unit is adjacent the frame of the catering delivery rack.

6. The catering apparatus according to claim 3, wherein:
   (a) the apparatus includes a third thermal transfer unit; and
   (b) both the second thermal transfer unit and the third thermal transfer unit are:
      (i) adjacent one of the side covers;
      (ii) adjacent the frame of the catering delivery rack; and
      (iii) proximate the lower region.

7. A method of delivering heated food product, the method comprising the steps of:
   (a) providing a catering apparatus, wherein the apparatus comprises:
      (i) a catering delivery rack, the rack including:
         (1) a frame defining an upper region and a lower region;
         (2) the frame having a front access side;
         (3) a plurality of shelves, including at least a first shelf positioned in the upper region, a second shelf located in the lower region, and a third shelf located intermediate the first shelf and the second shelf;
         (4) heated food product placed upon at least one of the shelves; and
         (5) wheels attached to the frame to roll the catering apparatus to a desired location;
      (ii) an insulated cover, the insulated cover including:
         (1) an insulated enclosure cover having a right side cover, a left side cover, a back side cover, and a top cover; and (2) an insulated front cover to access the front access side of the frame;
(iii) a plurality of thermal transfer units, including at least a first thermal transfer unit and a second thermal transfer unit, wherein:
  (1) the first thermal unit is positioned at the upper region of the catering delivery rack; and
  (2) the second thermal unit is positioned at the lower region of the catering delivery rack; and
(b) opening a portion of the insulated front cover to access heated food product located on one of the shelves without exposing the other shelves.

* * * * *